*INVENTOR.*
Robertson R. Gannaway
BY
Foorman L. Mueller
Atty.

Patented Dec. 18, 1951

2,578,970

UNITED STATES PATENT OFFICE 2,578,970

THREE-DIMENSIONAL DISPLAY

Robertson R. Gannaway, Oak Park, Ill., assignor to Belmont Radio Corporation, Chicago, Ill., a corporation of Illinois Application May 21, 1949, Serial No. 94,587

3 Claims. (Cl. 315—9)

This invention relates to systems for graphically representing related mathematical variables on the viewing screens of cathode ray tubes, and particularly to systems for producing three-dimensional displays of such variables.

A cathode ray tube of standard construction has two sets of deflectors which serve to deflect the cathode ray in two separate directions (horizontally and vertically, for example), and the position of the cathode ray spot on the viewing screen at any particular instant is determined by the simultaneous values of the deflecting voltages or currents that are applied respectively to these deflectors. In most instances a cathode ray tube is employed to represent graphically the relationship between only two variables (for example, time and some other quantity which varies with time), and a strictly two-dimensional display is produced thereby. When a relationship involving three variables is to be represented graphically, it is desirable tthat an appearance of depth or perspective be created in the representation to indicate the presence of the third variable. In accordance with one proposal, the electrical quantity (voltage or current) supplied to at least one of these two deflectors is determined jointly by two of the three variables. Thus, if the variables $x$, $y$ and $z$ are involved, the horizontal deflection may be proportional to, say, $x$ plus a fraction of $z$, and the vertical deflection may be proportional merely to $y$ alone or to $y$ plus a fraction of $z$. The resulting display may be given a three-dimensional interpretation by the person viewing it, although actually it is presented in but two dimensions. In prior cathode ray tube systems of this character, the displays have lacked a convincing appearance of depth, and often a skillful exercise of imagination has been required to interpret them properly in three dimensions. This is not always satisfactory, for the reason that skilled observers may not be on hand to interpret the displays.

An object of the present invention is to represent three concurrent variables graphically on cathode ray tubes or the like in such a fashion that the three-dimensional significance of the resulting display will be apparent to even the most unskilled observer, providing the observer has normal binocular depth perception.

Another object is to provide an improved cathode ray tube system adapted to utilize electrical quantities whose simultaneous values represent three variables for presenting to the observer a display that is genuinely three-dimensional, and not merely a simulated three-dimensional display as has been done in the past.

A further object is to provide a novel system for stereoscopically representing three variables on cathode ray tubes of standard construction.

A feature of the invention is the provision of a viewing system having two cathode ray tubes whose deflecting circuits are adapted to utilize the information represented by three variable electrical quantities for stereoscopically displaying a picture representing a given relationship among such quantities.

Another feature is the provision of divider means and mixer means for causing one of the electrical quantities to modify the deflections produced by the other two electrical quantities in each of the tubes, and for causing the extent of such modification in one tube to differ from that in the other tube, whereby a true appearance of depth is created when the images are viewed stereoscopically.

The foregoing and other objects, features and advantages of the invention will be better understood from a study of the following description taken in conjunction with the accompanying drawings, wherein.

The present invention utilizes any three electrical inputs such as voltages or currents having values representative of three mathematical variables involved in a common relationship. For convenience, these inputs are respectively designated as the quantities $x$, $y$ and $z$. The $x$ input is applied to the horizontal deflectors of two cathode ray tubes arranged in side-by-side relation, and the $y$ input is applied to the vertical deflectors of the tubes. The $z$ input modifies either or both of the $x$ and $y$ inputs applied to either or both of the tubes, according to the manner in which the invention is utilized. In a general case, four fractional components of the $z$ input are derived by means of suitable dividers. Through the medium of mixers these fractional components are added respectively to the two $x$ inputs and to the two $y$ inputs which are applied to the horizontal and vertical deflectors of the cathode ray tubes. Hence, the horizontal and vertical deflections of the cathode ray spot on the viewing screen of each tube are influenced to some extent by the value of $z$. Moreover, the resultant deflection of the cathode ray spot on the screen of one tube is different from the resultant deflection of the cathode ray spot on the screen of the other tube. It is this difference in the displacements of the two images which provides a true three-dimensional effect when the images are viewed stereoscopically. The general system described thus far may be simplified under certain conditions as will be explained more fully hereinafter.

Figure 1:
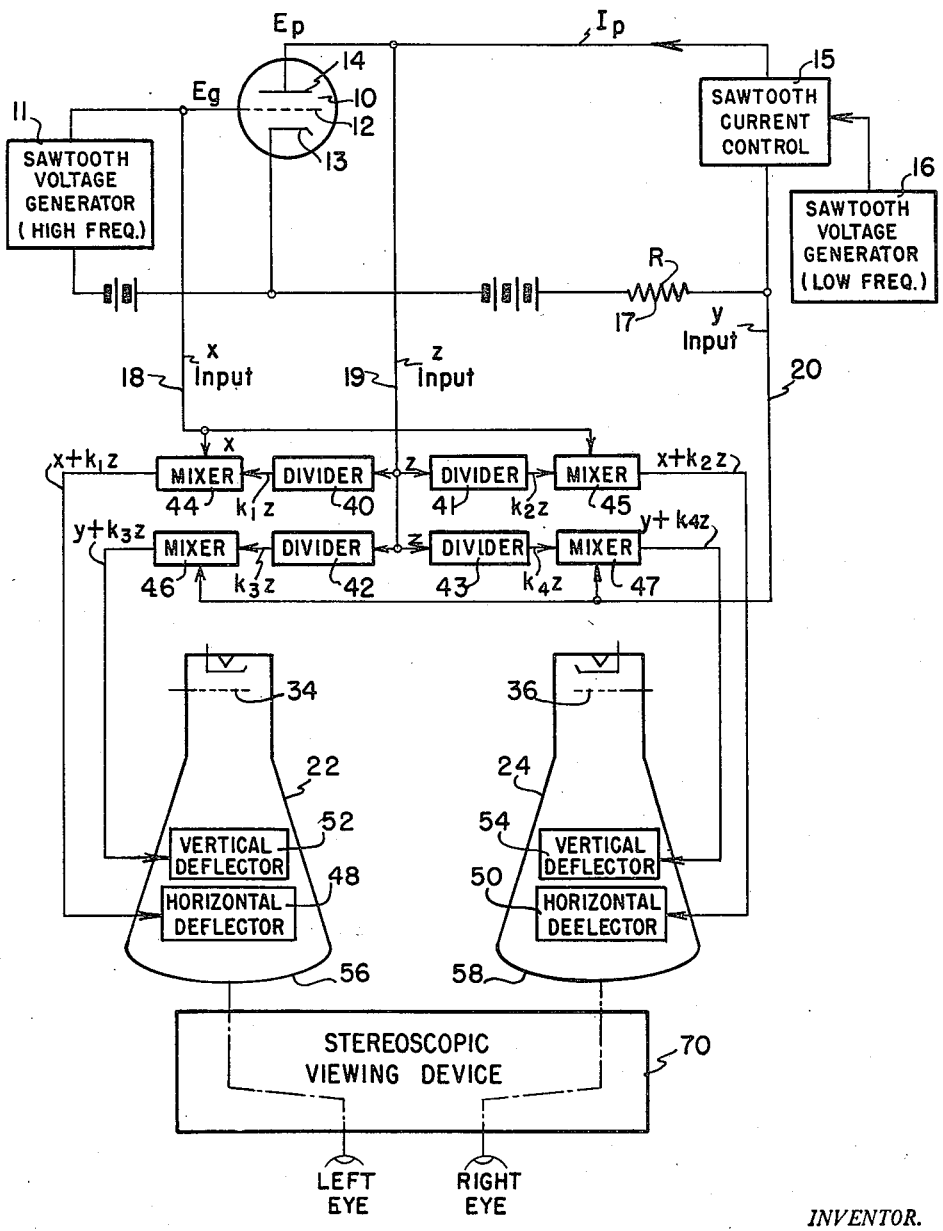
Fig. 1 is a diagrammatic representation of a typical system embodying the invention.

Fig. 1 illustrates a typical system embodying the invention in its most general form. In this embodiment the invention is adapted to display graphically the grid voltage—plate voltage—plate current characteristics of a given vacuum tube 10. The three variables in this case are the grid voltage $E_g$, the plate voltage $E_p$ and the plate current $I_p$. A high-frequency sawtooth voltage generator 11 develops the grid voltage $E_g$ and applies the same to the grid 12 of the tube 10. This voltage, of course, is measured with reference to the cathode 13 of the tube 10. The flow of plate current $I_p$ to the plate 14 of the tube 10 is controlled by a current control device 15. The current control device 15, in turn, is governed by a low-frequency sawtooth voltage generator 16. The plate current $I_p$, in flowing through the tube 10, produces a plate voltage $E_p$ between the cathode 13 and the plate 14, and it also flows through a resistor 17 having a value of resistance R, producing a voltage drop $I_pR$ which is proportional to the current $I_p$.

Three conductors 18, 19 and 20 are connected to the vacuum tube circuit in such fashion that the grid voltage $E_g$ is impressed upon the conductor 18, the plate voltage $E_p$ is impressed upon the conductor 19, and the voltage $I_pR$ (which represents the plate current $I_p$) is impressed upon the conductor 20. These three voltages are respectively designated the $x$ input, the $z$ input and the $y$ input. Through the medium of the apparatus which is about to be described, the information represented by these three electrical quantities is displayed graphically on the viewing screens 56 and 58 of the cathode ray tubes 22 and 24 in such a manner as to provide a stereoscopic picture comprising a family of curves or a surface in three dimensions. The three-dimensional character of this representation is readily apparent to the observer and does not require any mental interpretation to introduce the element of depth to the picture.

In the system illustrated in Fig. 1, the $x$ input, modified by the $z$ input, is applied to the horizontal deflectors 48 and 50 of the cathode ray tubes 22 and 24. The $y$ input, modified by the $z$ input, is applied to the vertical deflectors 52 and 54 of the cathode ray tubes 22 and 24. Considering first the $z$ input, this input is fed respectively to dividers 40, 41, 42 and 43 as shown in Fig. 1. Each of these dividers is adjusted to pass only a fractional part of the $z$ input. Where this input consists of a voltage, the divider may be a simple potentiometer. If the input is in the form of a current, a comparable current dividing means is employed.

The respective outputs of the dividers 40 to 43 are designated $k1z$, $k2z$, $k3z$ and $k4z$. $k1z$ is combined with the $x$ input in a mixer 44. $k2z$ is combined with the $x$ input in a mixer 45. $k3z$ is combined with the $y$ input in a mixer 46. $k4z$ is combined with the $y$ input in a mixer 47. The combined inputs are applied respectively to the horizontal deflectors 48 and 50 and to the vertical deflectors 52 and 54 of the cathode ray tubes 22 and 24. These deflectors, depending upon whether the tubes are of the electrostatic or electromagnetic type, may be in the form of plates or coils.

Thus, at any particular instant, the input to the horizontal deflector 48 is $x+k1z$. The input to the horizontal deflector 50 is $x+k2z$. The input to the vertical deflector 52 is $y+k3z$, and the input to the vertical deflector 54 is $y+k4z$. The coefficients $k1$, $k2$, $k3$ and $k4$, may, in general, have different values, although it is found preferable in practice to make $k3$ equal to $k4$. $k1$ and $k2$ are unequal.

In order that the cathode ray or electron beam in each of the tubes 22 and 24 will trace out the desired family of curves or surface image on the viewing screen, the control grid 34 or 36 of this tube is maintained at a potential sufficient to produce a luminous trace of the electron beam. The stereoscopic viewing device 70, through which the viewing screens 56 and 58 are seen by the observer, comprises any suitable arrangement of lenses or mirrors for bringing the images respectively into line with the observer's eyes. The combined stereoscopic image presented to the observer is in three dimensions due to the fact that the two constituent images on the screens 56 and 58 have, in effect, slightly different orientations. Instead of seeing a family of vacuum tube characteristics in a single plane, therefore, the observer actually sees this family of characteristics as a three-dimensional figure. The apparent distance of any point on the figure from the observer is determined by the value of $z$ (or plate voltage) for that particular point.

Figure 2:
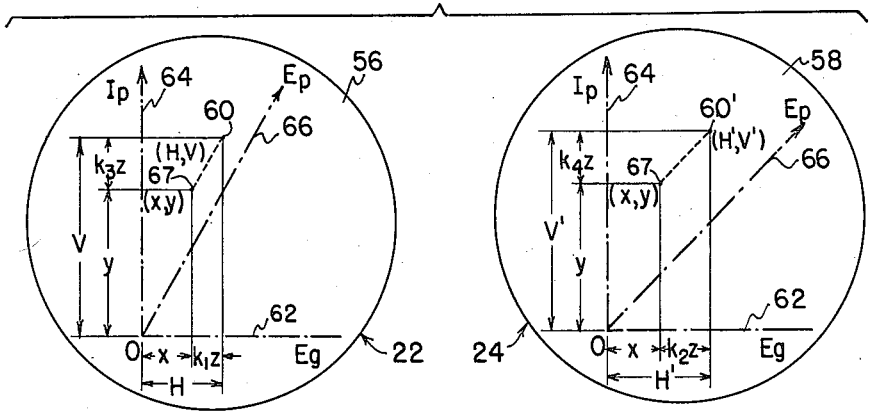
Fig. 2 is a schematic illustration of two cathode ray tube screens with imaginary reference axes thereon, showing in a general way the geometrical relationships involved in stereoscopically representing three variables according to the invention.

Fig. 2 illustrates schematically some of the geometrical relationships which are involved in the stereoscopic presentation of the data represented by the $x$, $y$ and $z$ inputs. In this view the screens 56 and 58 of the cathode ray tubes 22 and 24 are indicated in horizontally aligned relationship as they normally would be in practice. On each viewing screen there is represented a set of imaginary reference axes 62, 64 and 66 extending from an origin O which occupies a like position on each screen. The respective values of the grid voltage $E_g$, plate current $I_p$ and plate voltage $E_p$ may be measured along these axes 62, 64 and 66.

At any particular instant, the cathode ray scanning spot occupies a position on the viewing screen which is determined by the simultaneous values of these three variables, which will be designated respectively $x$, $y$ and $z$ for convenience. The scanning spot on the screen 56 is assumed (at a given instant) to be at point 60, while the scanning spot on the screen 58 is assumed to be at point 60'.

The quiescent point of the scanning spot is assumed to be at the origin O of the reference axes in each instance. As $x$ and $y$ increase in value, the scanning spot moves to the right and upwardly relative to O. The horizontal deflection H of the scanning spot on the screen 56 is equal to the sum of $x$ and $k1z$. The vertical deflection V is equal to the sum of $y$ and $k3z$. The scanning spot is positioned at the point 60 which has an abscissa H and an ordinate V. It would be only in the event that $z$ (that is, $E_p$) were equal to zero that the scanning spot would occupy a position such as 67 having an abscissa $x$ and an ordinate $y$.

Referring now to the viewing screen 58 shown in Fig. 2, similar considerations may be applied here. The scanning spot occupies a position 60' in which the horizontal deflection or abscissa H' is equal to the sum of $x$ and $k2z$, while the vertical deflection or ordinate V' is equal to the sum of $y$ and $k4z$. Usually, as explained above, it will be found convenient to make $k4$ the same as $k3$, so that V' is the same as V. H', however, differs from H because of the difference in the values of $k1$ and $k2$. Typical values of the various constants would be: 0.3 for $k1$, 0.5 for $k2$, 0.5 for $k3$, and 0.5 for $k4$.

Thus, the point 60' is displaced farther to the right from its origin O than is the point 60 with reference to its origin O. Therefore, the lines which are traced out by the scanning electron beam on the screen 58 are shifted to the right of the corresponding lines traced out on the screen 56, and furthermore, the amount of this shift varies with the instantaneous value of the $z$ input. This is analogous to the phenomenon which is experienced when an object is viewed first with one eye alone and then with the other eye alone. Therefore, when the image on the screen 56 is presented to the observer's left eye, and the image on the screen 58 is presented to the observer's right eye, through the medium of the stereoscopic viewing device 70, the observer is able to sense the depth of the picture without difficulty.

Figure 3:
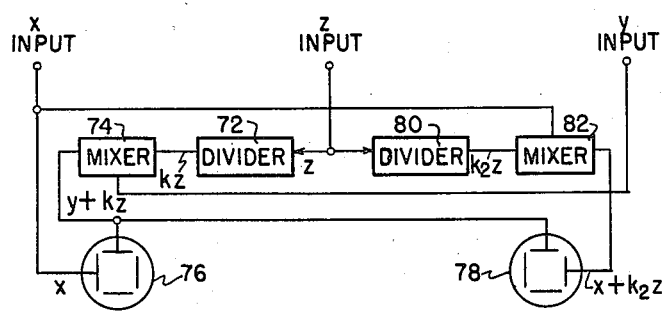
Figs. 3 and 4 are schematic diagrams respectively illustrating modified forms of the invention.

The values of $k3$ and $k4$ can be made equal, as suggested above, whenever the observer's eyes are on the same horizontal level, which is usually the case. This would enable a single divider to be used in place of the two dividers 42 and 43 in Fig. 1, and a single mixer to be used in place of the two mixers 46 and 47. A further simplification is possible by making the value of $k1$ equal to zero and selecting a small value for $k2$. An arrangement which embodies both of these simplifications is illustrated in Fig. 3. $k3$ and $k4$ are both assumed equal to $k$. A divider 72 responsive to the $z$ input furnishes a fractional part $kz$ which is mixed with the $y$ input by the mixer 74. The combined signal $y+kz$ is applied to the vertical deflectors of the tubes 76 and 78. These deflectors are shown herein as electrostatic deflectors, although they could equally well be electromagnetic deflectors. The $x$ input is applied directly to the horizontal deflector of the left-hand tube 76. A divider 80 responsive to the $z$ input furnishes a fractional signal $k2z$ which is mixed with the $x$ input by the mixer 82. The combined signal $x+k2z$ is applied to the horizontal deflector of the right-hand tube 78.

Figure 4:
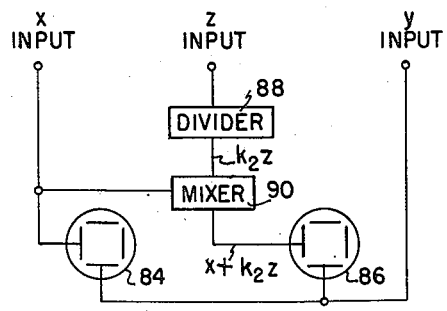

A still further simplification can be accomplished by making each of $k1$, $k3$ and $k4$ equal to zero. This reduces the system to the simplified embodiment shown in Fig. 4. Here, the $x$ input is applied directly to the horizontal deflector of the left-hand tube 84, and the $y$ input is applied directly to the vertical deflectors of the left-hand and right-hand tubes 84 and 86. The $z$ input is fed to a divider 88 from which a fractional signal $k2z$ is fed to a mixer 90, where it combines with the $x$ input. The combined signal $X+k2z$ is applied to the horizontal deflector of the right-hand tube 86.

Figure 5:
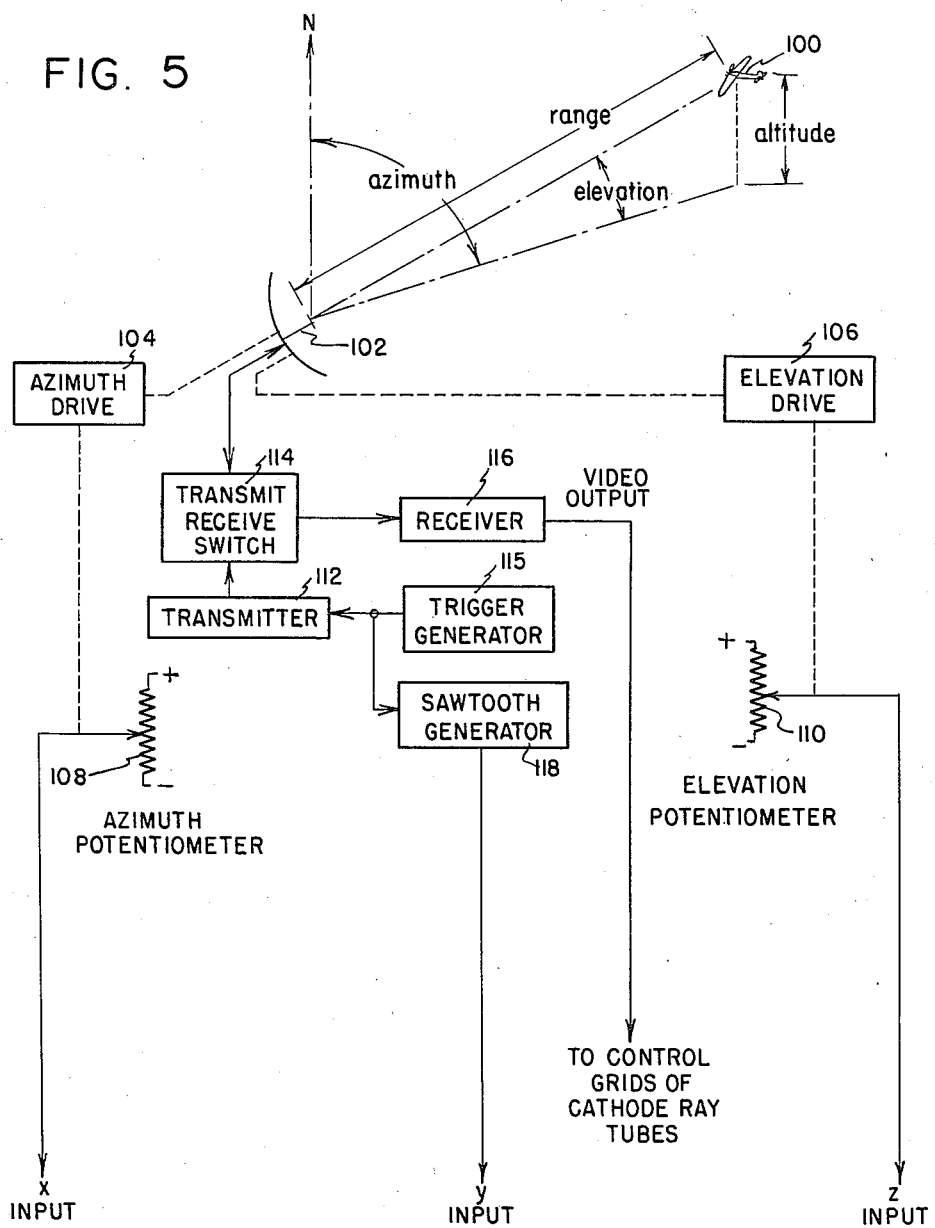
Fig. 5 diagrammatically illustrates the manner in which the invention may be adapted for use with a radar system.

Another adaptation of the invention is illustrated schematically in Fig. 5. This embodiment is utilized to represent graphically the positions of objects in space. In this instance, the three variables are the azimuth, elevation and range of a target such as 100 with reference to a predetermined observation point. Such information is readily furnished by standard radar equipment. A scanning antenna 102 is caused to make periodic excursions in azimuth and elevation, being actuated by the azimuth drive 104 and the elevation drive 106. The drives 104 and 106 also are mechanically coupled to an azimuth potentiometer 108 and an elevation potentiometer 110, respectively. The $x$ and $z$ inputs to the cathode ray tube deflecting circuits depend upon the instantaneous settings of the potentiometers 108 and 110.

Information as to the range of each target as 100 is obtained in the well known manner by radiating from the antenna 102 a pulsed, exploratory beam of high-frequency energy which is reflected from objects encountered by the beam. The exploratory pulses are generated by the transmitter 112 under the control of a trigger generator 115 and are fed through a transmit-receive switch 114 to the antenna 102. The switch 114 protects the receiver 116 from the high-energy transmitted pulses.

The reflected pulses or echoes picked up by the antenna 102 are returned through the transmit-receive switch 114 to the receiver 116. These echoes appear as video pulses in the output of the receiver 116. These video pulses are applied to the control grids as 34 and 36, Fig. 1, of the cathode ray tube. In this embodiment of the invention the control grids normally are biased to such a value that the scanning electron beam leaves no perceptible trace upon the viewing screen of each cathode ray tube. However, when a video pulse is applied to each control grid, the electron beam is momentarily intensified to produce a bright spot on the viewing screen of the tube. Thus, each target as 100 detected by the exploratory beam of the system is represented on the viewing screen of each cathode ray tube as a visible spot.

The $y$ input to the cathode ray tube deflecting circuits is derived from a sawtooth generator 118 under the control of the trigger generator 115. Each $y$ sweep of the electron beam in each of the cathode ray tubes is initiated when a pulse is transmitted by the system, but the electron beam leaves no visible trace until the instant when a return pulse or echo is received by the system.

The cathode ray tube deflecting circuits which utilize the $x$, $y$ and $z$ inputs furnished by the radar system of Fig. 5 are identical with the deflecting circuits utilizing the $x$, $y$ and $z$ inputs in Fig. 1. The picture which is presented to the observer is made up of individual point images, each being located according to the position of a reflecting object in space relative to the scanning antenna 102. It would be only in the case of a large object that any perceptible surface configurations could be detected. In some instances it may be desirable to interchange the inputs for obtaining, in effect, a different orientation of the reference axes.

The systems described thus far do not take into account the foreshortening due to perspective. Where true perspective is desired in the representation, it can be introduced by subjecting the horizontal and vertical deflecting signals to a gain control process after the fractional $z$ signals have been added to the $x$ and $y$ signals. Another way in which to take account of perspective is to control the brightness of the cathode ray spot on each tube screen according to the value of one variable.

There have been disclosed herein the basic principles of the invention whereby a geometrical display representing the relationship between three concurrent variables is obtained. Several applications of this invention have been shown, one of these being concerned with the representation of vacuum tube performance data and the other being the representation of objects in space detected by a radar system. In each instance the information which is displayed to the observer involves three variables, respectively represented by electrical quantities such as voltages or currents. Obviously the invention can be adapted to still other uses, all for the purpose of displaying graphically the relationships among three concurrent variables.

Hence, the particular embodiments of the invention disclosed herein are not intended to limit the scope of the invention as set forth in the appended claims.

I claim:

1. Apparatus for displaying graphically in three dimensions the data embodied in three variable electrical quantities whose simultaneous values respectively represent three related mathematical variables, such apparatus comprising first and second cathode ray tubes, each of said tubes having two deflectors respectively arranged so that they are effective when electrically excited to establish two cathode ray deflecting fields tending to deflect the cathode ray of that tube in directions paralleling two given reference axes in a single plane, first and second mixers, means for introducing to each of said mixers inputs derived from two of the three electrical quantities in predetermined proportions, third and fourth mixers, and means for introducing to each of said third and fourth mixers inputs derived from one of said two electrical quantities and the third electrical quantity in predetermined proportions, the deflectors of said first cathode ray tube being respectively responsive to the outputs of said first and third mixers, and the deflectors of said second cathode ray tube being respectively responsive to the outputs of said second and fourth mixers.

2. Apparatus for displaying graphically in three dimensions the data embodied in three variable electrical quantities whose simultaneous amplitudes respectively represent three related mathematical variables, such apparatus comprising first and second cathode ray tubes, each of said tubes having two deflectors respectively arranged so that they are effective when electrically excited to establish two cathode ray deflecting fiields tending to deflect the cathode ray of that tube in directions paralleling two given reference axes in a single plane, mixer means including first, second, third and fourth mixers, divider means including first, second, third and fourth dividers respectively arranged to introduce into said mixers various fractional amounts of the amplitude of said one electrical quantity, means for introducing to each of said first and second mixers another electrical quantity, means for introducing to each of said third and fourth mixers still another electrical quantity, and means for applying the respective outputs of said mixers to the deflectors of said cathode ray tubes, whereby the deflections of the cathode rays in said tubes are influenced to various extents by the amplitude of said one electrical quantity.

3. Apparatus for displaying graphically in three dimensions the data embodied in three variable electrical quantities whose simultaneous amplitudes respectively represent three related mathematical variables, such apparatus comprising first and second cathode ray tubes arranged side by side, each of said tubes having horizontal and vertical deflectors, means for applying to the horizontal deflector of said first tube the first of said electrical quantities, a first divider for furnishing a predetermined fractional amount of the amplitude of the third electrical quantity, a first mixer for combining the output of said first divider with said first electrical quantity, means for applying the output of said first mixer to the horizontal deflector of said second tube, a second divider for furnishing another predetermined fractional amount of the amplitude of said third electrical quantity, a second mixer for combining the output of said second divider with the second of said electrical quantities, and means for applying the output of said second mixer in parallel to the vertical deflectors of said first and second tubes.

ROBERTSON R. GANNAWAY.

REFERENCES CITED

The following references are of record in the file of this patent:

UNITED STATES PATENTS

| Number | Name | Date |
|---|---|---|
| 2,408,050 | De Rosa | Sept. 24, 1946 |
| 2,434,897 | Ayres | Jan. 27, 1948 |
| 2,449,542 | Ayres | Sept. 21, 1948 |
| 2,455,456 | Whittaker | Dec. 7, 1948 |
| 2,514,828 | Ayres | July 11, 1950 |
| 2,531,466 | Ranger | Nov. 28, 1950 |
| 2,538,800 | Ranger | Jan. 23, 1951 |
| 2,540,121 | Jenks | Feb. 6, 1951 |